H. O. WIESE.
TRACTION WHEEL.
APPLICATION FILED OCT. 31, 1916.
1,270,474.
Patented June 25, 1918.
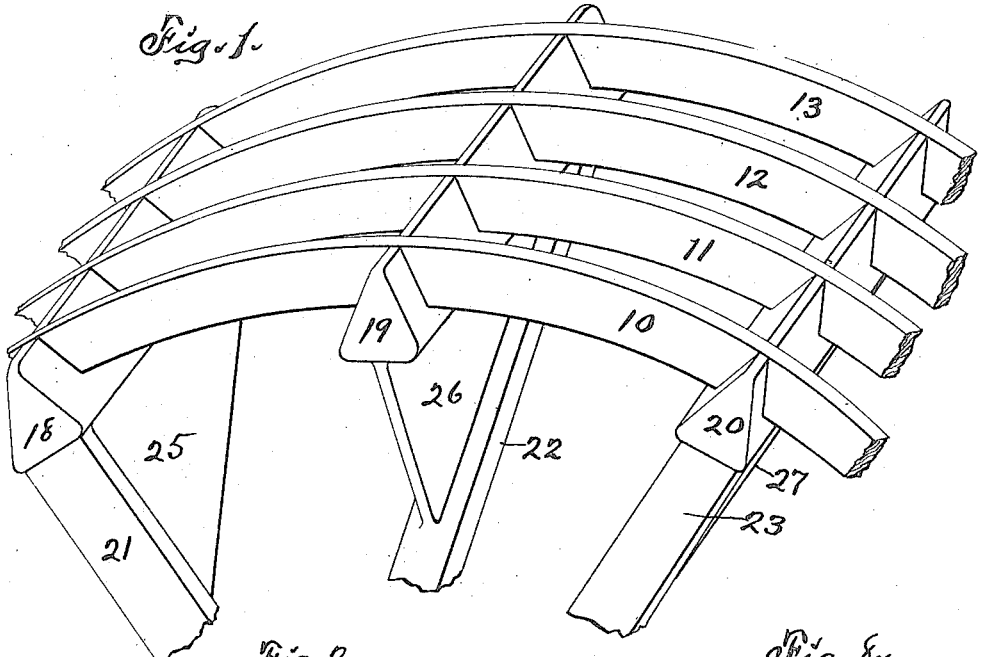
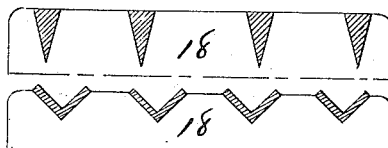
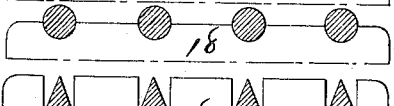
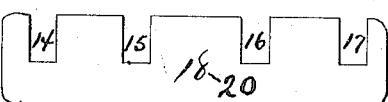
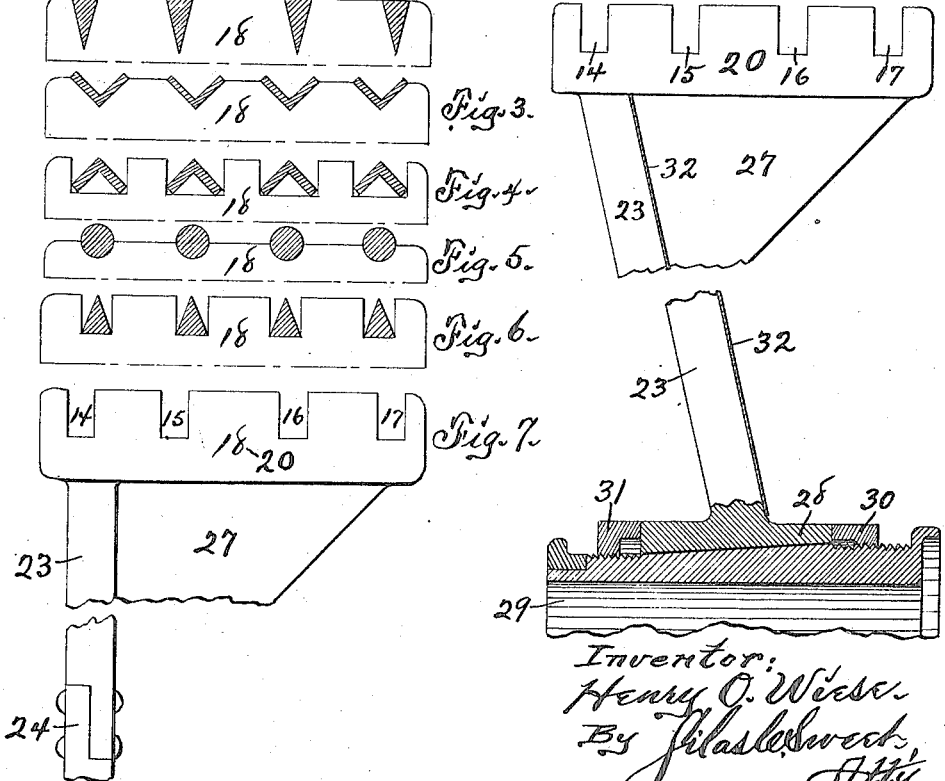

UNITED STATES PATENT OFFICE.

HENRY O. WIESE, OF PERRY, IOWA.

TRACTION-WHEEL.

1,270,474.	Specification of Letters Patent.	Patented June 25, 1918.

Application filed October 31, 1916. Serial No. 128,750.

*To all whom it may concern:*

Be it known that I, HENRY O. WIESE, citizen of the United States of America, and resident of Perry, Dallas county, Iowa, have invented a new and useful Traction-Wheel, of which the following is a specification.

The object of this invention is to provide an improved construction for traction wheels, especial attention being given to the rim or tread portion thereof.

A further object of this invention is to provide a construction that will facilitate travel over a tread surface without packing or compressing said surface.

A further object of this invention is to provide a construction whereby a traction wheel may travel over plowed ground during the operation of planting or cultivating a crop without packing or compressing the soil surface.

A further object of this invention is to provide a construction that will facilitate cleaning or clearing the rim of a traction wheel automatically of soil accumulated or picked up during travel.

A further object of this invention is to provide an improved construction for traction and spoke elements whereby the same may be conveniently removed and replaced relative to a hub and rim members.

A further object of this invention is to provide an improved construction for traction lugs.

A further object of this invention is to provide an improved construction for rim members or tread members of a traction wheel.

My invention consists in the construction, arrangement and combination of elements hereinafter set forth, pointed out in my claims and illustrated by the accompanying drawing, in which—

Figure 1 is a perspective of a segment of a wheel showing rim or tread members and traction lug members of one form in proper relation for practical use. Figs. 2 to 7 inclusive are cross-sections of the wheel rim showing various forms of tread members and traction lug members. Fig. 8 is an elevation partly in section showing one form of traction lug and one form of spoke therefor, together with means for securing the spoke to a hub, the hub being shown conventionally.

In the construction of the device as illustrated in Figs. 1 and 7 the numerals 10, 11, 12, 13 designate counterpart rings or tread members, which are formed rectangular in cross-section and have their greatest transverse dimension radially of the arc in which they trend. The tread members or rings preferably are of the same diameter and are spaced apart laterally, such spacing apart being effected by mounting the rings in notches 14, 15, 16, 17 in traction lugs 18, 19, 20. Any desired number of traction lugs may be employed throughout the circumference of the wheel and the lesser number here illustrated are typical of the greater number which may be employed. The traction lugs 18, 19, 20 preferably are approximately triangular in cross-section and are arranged so that one face of the triangle may be in the plane of a chord of the arc of the rings; one apex of the triangle being somewhat flattened and arranged flush with the outermost arc of the tread rings. This construction provides for good and sufficient engagement of the lugs with the tread surface for traction purposes and also provides, in the peripheries of the rings, a good and sufficient tread surface comprised in spaced contacts of limited extent as contradistinguished to a broad, continuous contact throughout an imperforate rim. Such tread formed of spaced contacts avoids compressing and packing a path or tread surface, thus overcoming or eliminating the undesirable feature heretofore found in the use of traction wheels on plowed ground during the operation of planting or cultivating a crop. The lugs 18, 19, 20 are carried by spokes 21, 22, 23 arranged in spaced relations and radially of the wheel. The spokes 21, 22, 23, being typical of the greater number employed in a complete wheel, may be arranged perpendicular to the lugs as shown in Fig. 7 or inclined relative to the trend of the lugs, as shown in Figs. 1 and 8. When the spokes are arranged in inclined relations to the lugs, they alternate as to inclination as illustrated in Fig. 1, thus effecting a bracing of the lugs and rings alternately from opposite directions and providing a maximum of resistance to lateral flexure or lateral strain from the rim induced by the use of the wheel on laterally inclined planes and in turning from a straight path of travel. The spokes 21, 22, 23 may be secured to a hub (to form a complete wheel) in any desired manner such as by riveting or bolting to a short spoke 24 as shown in Fig. 7. The spokes 21, 22, 23 preferably are braced to the lugs 18, 19, 20 by integral webs 25, 26, 27, thus providing means for applying the strain of outer portions of a rim obliquely to the spokes.

The lugs and spokes may be constructed integrally such as of metal by molding (Fig. 8) and may continue in such form from the rim to the hub as shown in Fig. 8. In such construction each spoke preferably is formed with a base 28 adapted to engage a tapering surface of a hub 29 (shown conventionally), all of the bases 28 contacting at one end with a screw collar 30 on the hub and adapted to be engaged, compressed, seated, held and locked by a screw collar 31 engaging the outer ends of the bases, said collar 31 also being on the hub. Any wear, contraction or shrinkage of the spokes and lugs, tending to loosen them relative to the rings 10, 11, 12, 13, may be compensated for, taken up, adjusted and cured by adjustment of the screw collars 30, 31 on the hub 29.

It is to be understood that the hub may be of any desired form and construction and may be provided with any desired skein or bearings, the same forming no part of my present invention.

In Figs. 1 to 6 inclusive I have illustrated a lug formed with notches of various shape and size and also showing tread rings of various shape and size mounted in said notches, thus illustrating possible modifications of the tread rings and notches carrying the same, which may be of infinite variety. The purpose of this showing is to suggest modifications retaining the characteristics of spaced tread contacts and the arrangement of the same approximately flush with the outer ends of the lugs.

Sectional deflectors 32 are mounted on the spokes 21, 22, 23 (Fig. 8) and are adapted to receive and discharge laterally any soil or tread substance which may be received between the tread rings. The arrangement of the plurality of deflectors 32 on alternate spokes produces, in the complete wheel, a conical deflector susceptible of receiving and discharging laterally all of the tread substance collected by the skeleton tread.

Another function of the skeleton tread is to prevent lateral movement or skidding of the wheel rim.

I do not desire to be understood as limiting myself to any specific number of lugs or tread rings or any specific construction of the lugs or cross-section of the tread rings or shape of the notches in which said rings are mounted, nor any specific arrangement of the spokes relative to the hub or to other spokes used to secure them to the wheel.

I claim as my invention—

1. A traction wheel, comprising spaced tread rings, and traction lugs separately formed and loosely carrying said tread rings.

2. A traction wheel, comprising spaced tread rings, and traction lugs separately formed and provided with notches adapted loosely to receive said tread rings, said lugs being adapted to be expanded into contact with said rings.

3. A traction wheel, comprising spaced tread rings, traction lugs separately formed and loosely carrying said rings, and spokes integral with and carrying said traction lugs, said lugs and spokes being adapted to be expanded to contact the lugs with said rings.

4. A traction wheel, comprising spaced tread rings, traction lugs loosely carrying said rings, and spokes integral with and carrying said traction lugs, said spokes being separate from and adapted for attachment adjustably to a hub and also integrally braced to said lugs.

5. A traction wheel, comprising spaced tread rings, traction lugs loosely carrying said rings, and spokes integral with and carrying said traction lugs, said spokes being formed with bases separate from and adapted conjunctively to be adjustably secured to a hub.

6. A traction wheel, comprising separate spaced tread rings, traction lugs loosely carrying said rings, spokes carrying said traction lugs, and deflecting devices removably and replaceably mounted on said spokes.

Signed by me at Des Moines, Iowa, this nineteenth day of October, 1916.

HENRY O. WIESE.

Copies of this patent may be obtained for five cents each, by addressing the "Commissioner of Patents, Washington, D. C."